US010288968B2

(12) United States Patent
Weindorf et al.

(10) Patent No.: US 10,288,968 B2
(45) Date of Patent: May 14, 2019

(54) ELECTRONIC DISPLAY WITH MULTIPLE POLARIZER LAYERS

(71) Applicants: Paul Fredrick Luther Weindorf, Novi, MI (US); Brian John Hayden, Royal Oak, MI (US); Qais Sharif, Northville, MI (US)

(72) Inventors: Paul Fredrick Luther Weindorf, Novi, MI (US); Brian John Hayden, Royal Oak, MI (US); Qais Sharif, Northville, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 29 days.

(21) Appl. No.: 15/700,924

(22) Filed: Sep. 11, 2017

(65) Prior Publication Data

US 2019/0079332 A1 Mar. 14, 2019

(51) Int. Cl.
*G02F 1/1335* (2006.01)
*G02F 1/137* (2006.01)

(52) U.S. Cl.
CPC .... *G02F 1/13725* (2013.01); *G02F 1/133526* (2013.01); *G02F 1/133528* (2013.01); *G02F 2202/043* (2013.01)

(58) Field of Classification Search
CPC .............. G02F 1/133528; G02F 1/1333; G02F 1/1335; G02F 1/1336; G02F 1/0136; G02F 1/133602; G02F 1/133615; G02F 1/133308; G02F 1/0311; G02F 1/13; G02F 1/1323; G02F 1/133526; G02F 2202/28; G02B 27/26; G02B 27/2214; G02B 27/0172; G02B 27/0101; G02B 6/0056; G02B 6/0053; G02B 5/30; G02B 5/3025; H04N 13/337; H04N 13/359; H04N 13/398; H04N 13/305; H04N 13/354; G09G 3/36; G09G 3/3406; G09G 3/3413; G09G 2320/0626; G09G 2320/062; G09G 2320/064; G09G 2320/0646; G09G 2360/144; G09G 2360/16; G09G 2310/0237; H01L 51/5281; H01L 51/5293
See application file for complete search history.

(56) References Cited

U.S. PATENT DOCUMENTS

| 5,220,442 A | 6/1993 | Dingwall et al. |
| 2004/0100598 A1* | 5/2004 | Adachi ............ G02F 1/133536 349/113 |
| 2014/0120275 A1 | 5/2014 | Lu et al. |
| 2014/0340728 A1* | 11/2014 | Taheri ................. G02B 27/281 359/250 |
| 2015/0009444 A1 | 1/2015 | Shao et al. |
| 2016/0209684 A1 | 7/2016 | Yasumoto |
| 2016/0303970 A1 | 10/2016 | Krier et al. |
| 2016/0306219 A1 | 10/2016 | Jeong et al. |

* cited by examiner

*Primary Examiner* — Thoi V Duong
(74) *Attorney, Agent, or Firm* — Quinn IP Law

(57) ABSTRACT

Disclosed herein are devices, methods and systems for implementing an electronic display with a dead-front appearance with a combination of polarizing devices. Specifically, the various permutations and combinations disclosed herein each include a linear polarizer, an active polarizer, and various combinations of linear and curved lenses, each being driven by light sourced from a backlight display.

16 Claims, 6 Drawing Sheets

ELECTRONIC DISPLAY WITH MULTIPLE POLARIZER LAYERS

BACKGROUND

Electronic displays are provided in many contexts to electronically render digital information to a viewer. The electronic displays receive information, and render the information through lighted cells in patterns that reflect the texts and pictures employed to convey the information.

The electronic displays may be implemented in a variety of environments where electronic displays have not traditionally been employed, such as a vehicle, home appliance, advertisement/billboard, and the like. Accordingly, for aesthetic purposes, when employing said electronic displays, ensuring that said electronic displays blend into a bezel or background may be desired.

This effect, also known as a "dead-front", and has been attempted by numerous implementers of electronic displays integrated into a variety of contexts and environments. Several implementations have been attempted; however, with each implementation drawbacks become apparent.

FIG. 1(a) illustrates a side-view of a prior art implementation of an electronic display. As shown, a display 100 is provided. The display 100 is employed to providing electronic content to a viewer of the electronic display. The display screen 100 includes a bezel 101 defining a border of the display screen. Defining the portion within the bezel 101 is a display portion. The display portion includes a backlit display 102 and a display linear polarizer 103.

The display 100 is provided with a first layer 110 directly opposed to the display 100. This first layer 110 is a neutral density filter. A neutral density filter is a filter that reduces or modifies the intensity of all wavelengths or colors, of light equally, giving no changes in hue of color rendition. The filter transmission may range from colorless (clear) to grey (opaque), but the transmission rate is constant.

Also shown is an AR film 120 (disposed on the first layer 110). The AR film 120 may be provided to cancel first surface light reflections to minimize a viewer from seeing visibility variations from the electronic display 100 due to the lighting environment to which the electronic display 100 is exposed.

FIG. 1(b) illustrates a side-view of a prior art implementation of another electronic display. As shown, an electronic display 100 is provided with a dimmable lens 130. When the electronic display 100 is intended to be off, the dimmable lens 130 is configured to be in a low transmission state, and when the electronic display 100 is intended to be on, the dimmable lens 130 is adjusted to allow the proper luminance to be presented. The prior art lens dims both the ambient light and the display transmitted light equally and does not provide a transmission preference to the display transmitted light.

In either of the solutions proffered above, a backlighting strength associated with the electronic display 100 has to be adjusted accordingly, and often times increased in order to adjust for the compensated layers. Thus, while implementing dead-front solutions, the efficiency of existing electronic displays 100 may be insufficient.

SUMMARY

The following description relates to providing a system, method, and device for a implementing an electronic display with a dimmable lens for a dead-front implementation. Exemplary embodiments may also be directed to any of the system, the method, or an application disclosed herein.

Disclosed herein is an electronic display. The electronic display includes a backlight display configured to turn on and off, the backlight display including a display linear polarizer; a linear polarizer disposed on a surface on which the backlight display projects light; and an active polarizer coupled to an electronic circuit, the active polarizer configured to turn-on when the backlight display is on, and turn off when the backlight display is off.

In another example, the electronic display further includes a transparent lens.

In another example, the active polarizer is defined as a guest-host dichroic dye liquid crystal system.

In another example, the electronic circuit is configured to apply voltage to the active polarizer to allow at least 70% transmission.

In another example, the backlight display, the linear polarizer, the active polarizer, and the lens are optically bonded with each other.

In another example, the the backlight display physically abuts the linear polarizer, the linear polarizer physically abuts the active polarizer, and the active polarizer physically abuts the lens.

In another example, the electronic display further includes an air gap between the linear polarizer and the active polarizer.

In another example, the backlight display physically abuts the linear polarizer, and the active polarizer physically abuts the lens.

In another example, the electronic display further includes a second linear polarizer.

Additional features of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed. Other features and aspects will be apparent from the following detailed description, the drawings, and the claims.

DESCRIPTION OF THE DRAWINGS

The detailed description refers to the following drawings, in which like numerals refer to like items, and in which.

DETAILED DESCRIPTION

Figure 1A:
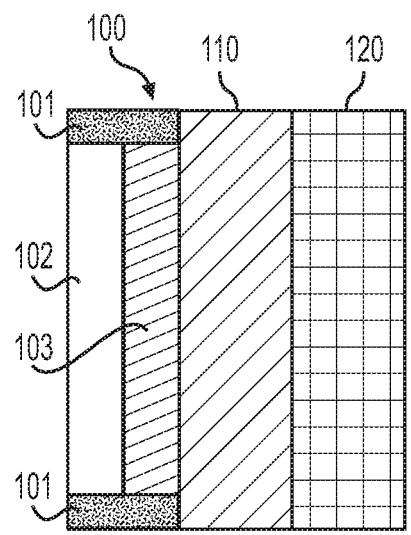
FIGS. 1(a) and (b) illustrate a side-view of a prior art implementation of an electronic display.
Figure 1B:
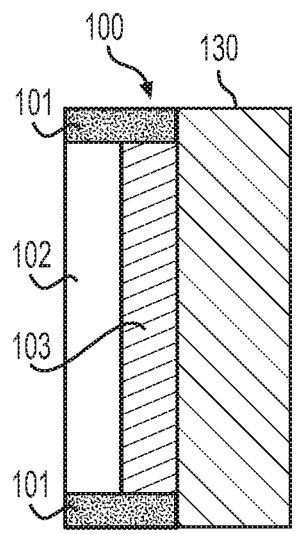

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Disclosed herein is a dimmable lens system configured to provide a dead-front appearance when the electronic display is not being employed ("off-state"), and a substantially dead front appearance when the electronic display is employed ("on-state"). The aspects disclosed herein allow for advantages in the following manners:

1) Low Haze;
2) A high dimming transmission range from 35% (driven state) to 5% (non-driven state) for non-polarized ambient light and a high display polarized light transmission of about 70% when driven in the "on" state;
3) Fast response time;
4) A small color shift;
5) Employment with flexible displays (or non-linear shaped displays);
6) None reliance on electrochromic technology; and
7) Cost savings.

Figure 2:
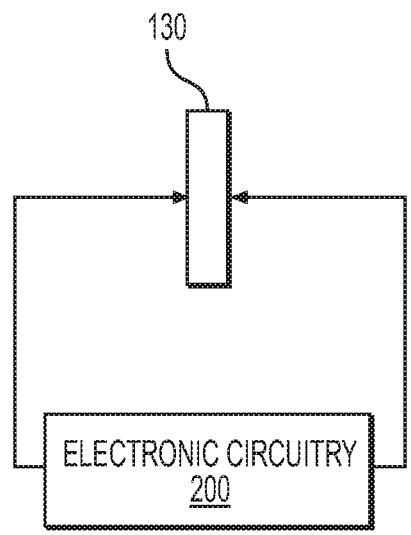
FIG. 2 illustrates an example of an active polarizer employing the aspects disclosed herein.

FIG. 2 illustrates an example of an active polarizer 130 employing the aspects disclosed herein. The active polarizer 130 is electronically coupled to an electronic circuit 200. The electronic circuit 200 connects to the active polarizer 130 via a first node and a second node. As the electronic circuit 200 applies voltage to the active polarizer 130, the state of the polarization changes accordingly. Thus, the active polarizer 130 may employ both an on-state and an off-state. In the on-state, display content disposed on one side of an active polarizer 130 is visible by a viewer. In an off-state, the active polarizer 130 absorbs light waves. In this manner, the ambient light is absorbed and essentially no reflected light from behind the lens is visible to the viewer during the off state.

The active polarizer 130 is based on a guest-host dichroic dye liquid crystal system. The guest dye is a collection of elongated molecules that can be either orthogonal or parallel based on the applied voltage. The orientation of the elongated molecules ultimately determines the polarization associated with the active polarizer 130.

Figure 3:
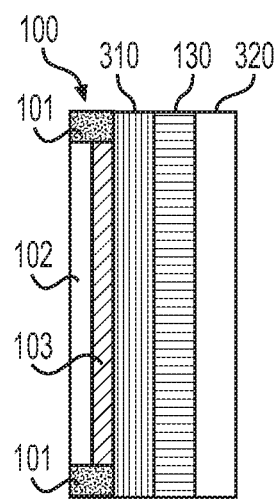
FIG. 3 illustrates a side-view of an example embodiment of an electronic display augmented with a dimmable lens system according to the aspects disclosed herein.
Figure 4:
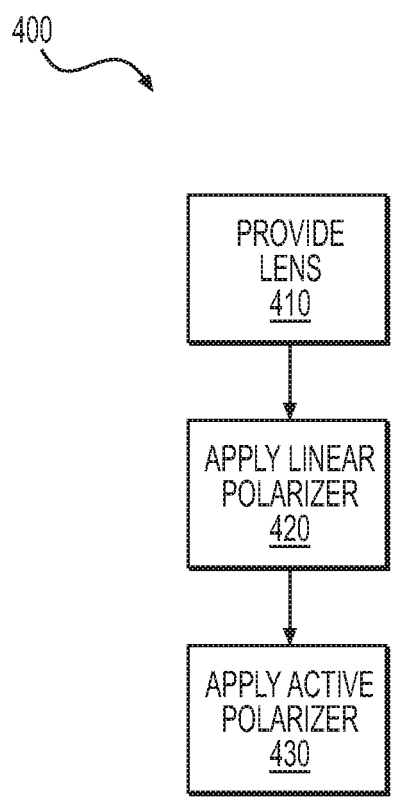
FIG. 4 illustrates a method 400 of manufacturing the structure shown in FIG. 3.

FIG. 3 illustrates a side-view of an example embodiment of an electronic display augmented with a dimmable lens system according to the aspects disclosed herein. FIG. 4 illustrates a method 400 of manufacturing the structure shown in FIG. 3.

As shown, the structure in FIG. 3 includes a display screen 100. The display screen 100 may be any technology employed to provide electronic content to a viewer, such as a TFT screen. The display screen 100 includes a bezel 101 defining a border of the display screen. Defining the portion within the bezel 101 is a display portion. The display portion includes a backlit display 102 and a display linear polarizer 103. The display linear polarizer 103 causes light produced and propagated by the backlit display 102 to undergo a linear polarization effect.

As shown on FIG. 3, a lens 320 is provided (410). On the side in which the display screen 100 presents content, a linear polarizer 310 is added (420).

Linear polarizers are polarizers designed to linearly polarize incoming light. Passing white light through a linear polarizer blocks half of the incident light, causing the electric field component to displace so that it oscillates in only one plane with respect to the direction of propagation.

Disposed on the linear polarizer 310 is an active polarizer 130 (430). The active polarizer 130 is similar to the one shown in FIG. 2 and is configured to operate in the manner described above. Also shown are a glass and/or plastic see-through lens 320 (although as explained further, in other embodiments, the lens 320 may be omitted). The elements in FIG. 3 may be optically bonded together. The linear polarizer transmission axis is aligned to the output polarization angle of the display. The active polarizer transmission axis is oriented to be orthogonal to the linear polarizer transmission axis. Therefore when the active polarizer is not activated (polarized state), the polarized light passing through the linear polarizer is extinguished by active polarizer. Conversely, when the active polarizer is activated (non-polarized state), linearly polarized light from the display is transmitted through both the active polarizer and linear polarizer with substantial transmission of about 70%.

Employing the aspects disclosed herein, and shown in FIG. 3, the required backlighting needed when using a linear/active polarizer versus not using a linear/active polarizer is much less. Thus, the amount of power consumption realized with an implementation in FIG. 3 is drastically reduced. Further, because a lesser powered backlight is employed, thermal gains associated with this implementation may also be realized.

Specifically, employing the electronic display 300 shown in FIG. 3, the Applicants have discovered that the active polarizer 130 may be driven to provide 70% display transmission. In other examples (not employing the structure), the prior art method may employ a neutral density filter of 15% transmission. The Applicant have discovered that the use of the active polarizer lens allows the amount of luminance required to be reduced by approximately 85% compared to the use of a static 15% neutral density lens.

FIGS. 5-10 illustrate side-views of several permutations of the electronic display 300. Each of the electronic displays shown in FIGS. 5-10 have a display screen 100, a linear polarizer element 310 and an active polarizing element 130.

The linear polarizer 310 associated with the active polarizer 130 is aligned with the display polarizer transmission angle such that the display polarized light is substantially transmitted. The active polarizer 130 transmission angle is oriented to be substantially orthogonal to the linear polarizer 310 transmission angle and therefore light is mostly absorbed when the active polarizer 130 is in the polarization state.

Although not shown, the display screen 100 includes both a display lighting element and a display linear polarizer disposed thereon.

Figure 5:
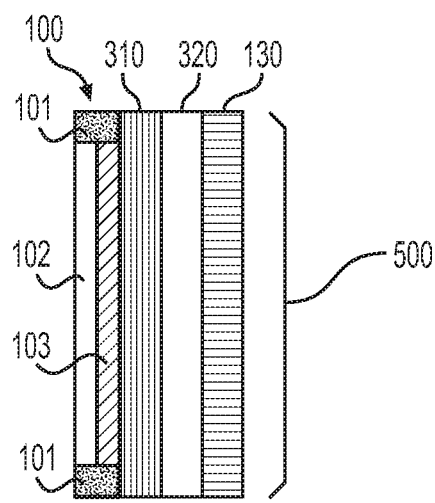
FIGS. 5-10 illustrate side-views of other exemplary embodiments of an electronic display according to the aspects disclosed herein.
Figure 6:
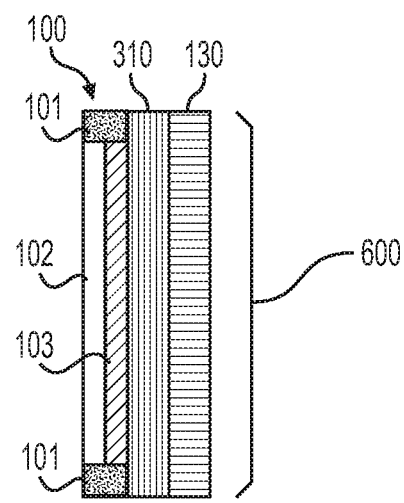

As shown in FIG. 5, electronic display 500 differs from electronic display in that the active polarizer 130 is disposed on an opposite surface of the lens 320, and the lens 320 is physically disposed in between the linear polarizer 310 and the active polarizer 130. As shown in FIG. 5, the lens 320 is not implemented in electronic display 600.

Figure 7:
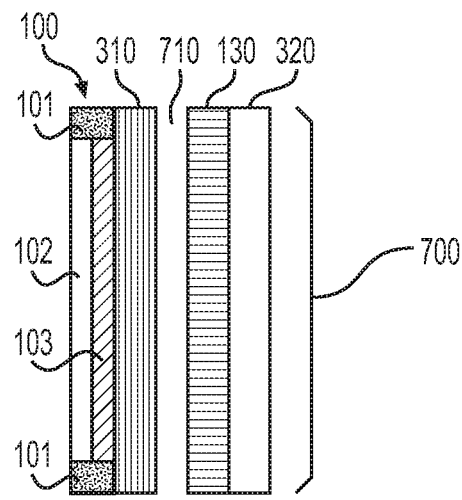
Figure 8:
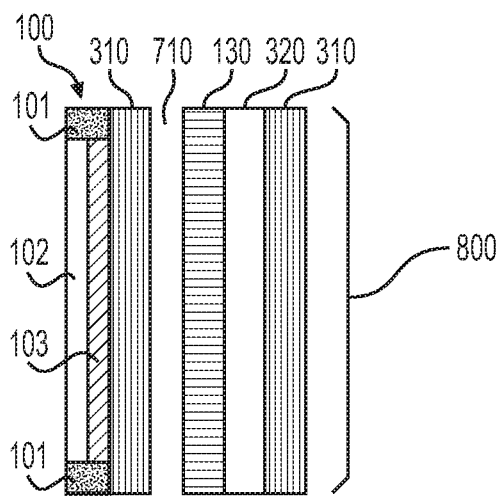

In FIG. 7, the electronic display 700 is similar to electronic display 300, except an air gap 710 is disposed between the linear polarizer 310 and the active polarizer 130. In FIG. 8, electronic display 800 is substantially similar to electronic display 700; however, a second linear polarizer 310 is also provided.

Figure 9:
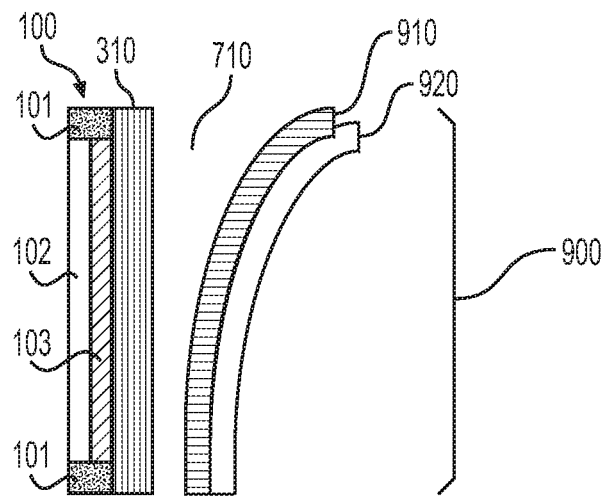
Figure 10:
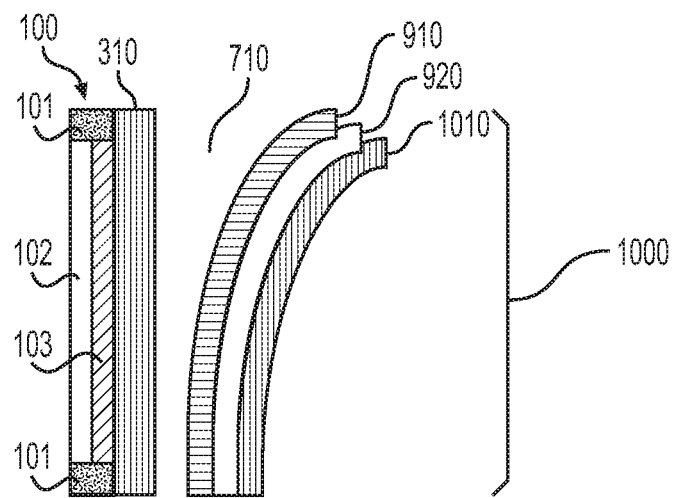

FIGS. 9 and 10 illustrate that the aspects disclosed herein may be implemented with screens of a non-linear type (and specifically curved). As shown in FIG. 9 via electronic display 900, the active polarizer 320 is replaced with a curved active polarizer 910 and a curved lens 920. In FIG. 10, the electronic display 1000 is substantially similar to electronic display 900; however, a second curved linear polarizer 1010 is also provided.

In each of the embodiments shown in FIGS. 5-10, the gains described in FIGS. 3 and 4 are also achieved. Thus, these implementations allow for less backlighting to be used, and thus gains in power and thermal energy reductions being achieved.

The active polarizers shown above may be electrically coupled to an automatic luminance control system, thereby being modified based on a user-defined amount configured to provide the dead-front appearance.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. An electronic display, comprising:
   a backlight display configured to turn on and off, the backlight display including a display linear polarizer;
   a linear polarizer disposed on a surface on which the backlight display projects light; and
   an active polarizer coupled to an electronic circuit, the active polarizer configured to turn on when the backlight display is on, and turn off when the backlight display is off.

2. The electronic display according to claim 1, further comprising a transparent lens.

3. The electronic display according to claim 1, wherein the active polarizer is defined as a guest-host dichroic dye liquid crystal system.

4. The electronic display according to claim 3, wherein the electronic circuit is configured to apply voltage to the active polarizer to allow at least 70% transmission.

5. The electronic display according to claim 2, wherein the backlight display, the linear polarizer, the active polarizer, and the lens are optically bonded with each other.

6. The electronic display according to claim 2, wherein the backlight display physically abuts the linear polarizer, the linear polarizer physically abuts the active polarizer, and the active polarizer physically abuts the lens.

7. The electronic display according to claim 2, wherein the backlight display physically abuts the linear polarizer, the linear polarizer physically abuts the lens, and the lens physically abuts the active polarizer.

8. The electronic display according to claim 2, further comprising an air gap between the linear polarizer and the active polarizer.

9. The electronic display according to claim 8, wherein the backlight display physically abuts the linear polarizer, and the active polarizer physically abuts the lens.

10. The electronic display according to claim 8, further comprising a second linear polarizer.

11. The electronic display according to claim 10, wherein the backlight display physically abuts the linear polarizer, the active polarizer physically abuts the lens, and the lens physically abuts the second linear polarizer.

12. The electronic display according to claim 2, further comprising an air gap between the linear polarizer and the active polarizer, wherein the active polarizer and the lens are curved.

13. The electronic display according to claim 12, further comprising a second linear polarizer.

14. The electronic display according to claim 13, wherein the second linear polarizer is curved.

15. The electronic display according to claim 12, wherein the backlight display physically abuts the linear polarizer, and the active polarizer physically abuts the lens.

16. The electronic display according to claim 14, wherein the backlight display physically abuts the linear polarizer, and the active polarizer physically abuts the lens, and the active polarizer physically abuts the second linear polarizer.

* * * * *